US010533634B2

(12) United States Patent
Lavigno, IV et al.

(10) Patent No.: US 10,533,634 B2
(45) Date of Patent: Jan. 14, 2020

(54) AXLE AND BEARING FOR CONVEYOR CHAIN LINK

(71) Applicant: AMF AUTOMATION TECHNOLOGIES, LLC, Tucker, GA (US)

(72) Inventors: William Watson Lavigno, IV, Peachtree Corners, GA (US); Kristopher Jon Soderstrom, Lawrenceville, GA (US)

(73) Assignee: AMF AUTOMATION TECHNOLOGIES, LLC, Tucker, GA (US)

(*) Notice: Subject to any disclaimer, the term of this patent is extended or adjusted under 35 U.S.C. 154(b) by 0 days.

(21) Appl. No.: 15/977,859

(22) Filed: May 11, 2018

(65) Prior Publication Data
US 2018/0259037 A1 Sep. 13, 2018

Related U.S. Application Data

(63) Continuation-in-part of application No. 15/660,123, filed on Jul. 26, 2017.
(Continued)

(51) Int. Cl.
| B65G 17/40 | (2006.01) |
| F16G 13/07 | (2006.01) |
| F16C 35/063 | (2006.01) |
| F16C 33/58 | (2006.01) |
| F16C 33/34 | (2006.01) |

(Continued)

(52) U.S. Cl.
CPC .............. *F16G 13/07* (2013.01); *B65G 17/32* (2013.01); *B65G 17/40* (2013.01); *B65G 39/20* (2013.01); *F16C 13/006* (2013.01); *F16C 19/06* (2013.01); *F16C 19/10* (2013.01); *F16C 33/32* (2013.01); *F16C 33/34* (2013.01); *F16C 33/586* (2013.01);
(Continued)

(58) Field of Classification Search
CPC ......... B65G 17/40; B65G 39/20; F16C 19/10; F16C 2326/58; F16C 13/006; F16C 35/063; F16C 35/065
USPC ...................... 198/750.4, 838, 841, 852, 853
See application file for complete search history.

(56) References Cited

U.S. PATENT DOCUMENTS

| 2,640,585 A | 6/1953 | Orwin |
| 3,015,527 A | 1/1962 | Schmidt |

(Continued)

OTHER PUBLICATIONS

International Search Report & Written Opinion for PCT/US2017/043901; dated Nov. 8, 2017; 21 pgs.

*Primary Examiner* — Joseph A Dillon, Jr.
(74) *Attorney, Agent, or Firm* — Gardner Groff & Greenwald, PC

(57) ABSTRACT

The invention relates to an axle and bearing for a conveyor chain link, such as those used in commercial bakery equipment. The conveyor chain link generally includes at least one roller bearing wheel with a central hole, an axle pin, and a link component with a bore. The axle pin is configured to extend through the hole in the roller bearing wheel and the bore in the link component to attach the at least one roller bearing wheel to the link component. The axle pin includes a medial portion having at least one surface engagement feature configured for anti-spin engagement with the link component. The roller bearing wheel includes at least one engagement feature for anti-spin engagement with the distal end of the axle pin.

13 Claims, 10 Drawing Sheets

Related U.S. Application Data

(60) Provisional application No. 62/366,792, filed on Jul. 26, 2016, provisional application No. 62/439,512, filed on Dec. 28, 2016, provisional application No. 62/516,170, filed on Jun. 7, 2017.

(51) Int. Cl.

| | |
|---|---|
| *F16C 33/32* | (2006.01) |
| *F16C 19/10* | (2006.01) |
| *F16C 13/00* | (2006.01) |
| *B65G 39/20* | (2006.01) |
| *B65G 17/32* | (2006.01) |
| *F16C 19/06* | (2006.01) |

(52) U.S. Cl.
CPC ........ *F16C 35/063* (2013.01); *F16C 2226/54* (2013.01); *F16C 2326/58* (2013.01)

(56) References Cited

U.S. PATENT DOCUMENTS

| | | | | |
|---|---|---|---|---|
| 3,602,150 A * | 8/1971 | Frost | ............ | B61B 13/04 104/172.4 |
| 3,653,493 A * | 4/1972 | Kerr | ............ | B65G 17/061 198/831 |
| 3,951,076 A | 4/1976 | Knudsen et al. | | |
| 3,971,601 A * | 7/1976 | Sytsma | ............ | B65G 17/20 384/492 |
| 4,059,180 A * | 11/1977 | Krivec | ............ | B65G 39/09 193/37 |
| 4,367,905 A * | 1/1983 | Nauta | ............ | B60B 33/0028 384/477 |
| 4,555,014 A * | 11/1985 | Krempa | ............ | B65G 17/385 104/172.5 |
| 4,729,470 A * | 3/1988 | Bacigalupe | ............ | B65G 17/061 104/140 |
| 4,798,149 A * | 1/1989 | Hoffmann | ............ | B61B 10/022 104/94 |
| 4,852,722 A * | 8/1989 | Houseman | ............ | B65G 17/323 198/803.7 |
| 5,277,126 A * | 1/1994 | Wendt | ............ | B65G 17/20 105/148 |
| 5,461,851 A * | 10/1995 | Lehrieder | ............ | B41F 13/03 198/851 |
| 5,584,584 A * | 12/1996 | Line | ............ | A01F 15/07 384/537 |
| 6,209,716 B1 * | 4/2001 | Bogle | ............ | B65G 17/086 198/834 |
| 6,450,326 B1 * | 9/2002 | Hoffmann | ............ | B65G 17/20 104/172.5 |
| 6,874,617 B1 * | 4/2005 | Layne | ............ | B65G 17/063 198/779 |
| 6,968,943 B2 * | 11/2005 | Kilby | ............ | A21C 13/02 198/800 |
| 7,086,525 B2 * | 8/2006 | Kilby | ............ | A21C 13/02 198/800 |
| 8,602,015 B2 | 12/2013 | Michelon | | |
| 8,985,310 B2 * | 3/2015 | Heitpatz | ............ | B65G 17/066 198/370.04 |
| 2002/0060143 A1 * | 5/2002 | Kilby | ............ | A21C 13/02 198/852 |
| 2002/0179416 A1 * | 12/2002 | Hoffmann | ............ | B65G 17/20 198/844.1 |
| 2003/0029701 A1 * | 2/2003 | Sykora | ............ | B65G 17/20 198/853 |
| 2003/0075420 A1 * | 4/2003 | Larkins | ............ | B61B 10/00 198/852 |
| 2003/0178288 A1 * | 9/2003 | Kilby | ............ | A21C 13/02 198/800 |
| 2005/0061637 A1 * | 3/2005 | Kilby | ............ | A21C 13/02 198/852 |
| 2005/0067252 A1 * | 3/2005 | Bowen | ............ | B65G 21/2054 193/37 |
| 2005/0139455 A1 * | 6/2005 | Sykora | ............ | B65G 17/20 198/853 |
| 2006/0118363 A1 * | 6/2006 | Tom | ............ | F16C 33/66 184/15.1 |
| 2007/0209911 A1 * | 9/2007 | Mader | ............ | B65G 17/385 198/852 |
| 2009/0044719 A1 | 2/2009 | Schmidt et al. | | |
| 2014/0298659 A1 * | 10/2014 | Lescorail | ............ | F16C 13/006 29/898.063 |
| 2014/0374219 A1 * | 12/2014 | Otto | ............ | B61B 10/025 198/678.1 |
| 2017/0313521 A1 * | 11/2017 | Okamura | ............ | B65G 23/00 |
| 2018/0031033 A1 | 2/2018 | Lavigno, IV et al. | | |

* cited by examiner

AXLE AND BEARING FOR CONVEYOR CHAIN LINK

CROSS-REFERENCE TO RELATED APPLICATIONS

This application is a continuation-in-part of U.S. Non-Provisional patent application Ser. No. 15/660,123 filed Jul. 26, 2017, which claims the benefit of U.S. Provisional Patent Application Ser. No. 62/366,792 filed Jul. 26, 2016, U.S. Provisional Patent Application Ser. No. 62/439,512 filed Dec. 28, 2016 and U.S. Provisional Patent Application Ser. No. 62/516,170 filed Jun. 7, 2017, the entireties of which are hereby incorporated herein by reference for all purposes.

TECHNICAL FIELD

The present invention relates generally to the field of conveyor equipment for manufacturing, and more particularly to a roller chain axle and bearing assembly for conveyor equipment such as in commercial baking systems, which reduces wear and improves equipment longevity.

BACKGROUND

Continuous conveyor systems are utilized in various commercial production equipment systems, such as in oven and proofer systems for commercial bakeries. These conveyor systems commonly include a roller chain that carries baking trays or other conveyed equipment or materials along a track or guide path through various stations of the system. Known roller chains may include bearing wheels or rollers coupled by an axle pin to link pieces of the conveyor chain.

In some known conveyor systems, the axle pin that holds the single row bearings together through the powder metal linkage pieces of the chain will sometimes spin freely around the inside of the bearing. This spinning may accelerate wear of the equipment, resulting in equipment failures, increased maintenance requirements, and system downtime.

Accordingly, it can be seen that needs exist for improved conveyor system equipment. It is to the provision of an axle and bearing for conveyor chain linkage meeting these and other needs that the present invention is primarily directed.

SUMMARY

In example embodiments, the present invention provides an axle and bearing for a conveyor chain link that includes anti-spin engagement between the bearing and the axle and includes anti-spin engagement between the axle and the link component.

In one aspect, the present invention relates to conveyor chain link including a link component, and axle pin, and at least one roller bearing wheel. The axle pin includes an elongated generally cylindrical axle pin body having a medial portion and two distal ends. The medial portion of the axle pin body has at least one surface engagement feature configured for anti-spin engagement with the link component. The at least one roller bearing wheel includes at least one engagement feature configured for anti-spin engagement with one of the distal ends of the axle pin body.

In another aspect, the invention relates to a method of assembling a conveyor chain link, the method includes positioning two roller bearing wheels on each side of a link component. Each roller bearing wheel comprises a central hole and the link component comprises a bore extending through a width of the link component. The hole of each roller bearing wheel is positioned to align with the bore of the link component. Next, an axle pin having an elongated generally cylindrical axle pin body and two distal ends is push fitted through the holes in the roller bearing wheels and the bore in the link component. The axle pin includes a medial portion with at least one surface engagement feature. The axle pin is positioned such that the at least one surface engagement feature is at least partially positioned within the bore of the link component and the distal ends of the axle pin extend beyond the holes of the roller bearing wheels. Next, the distal ends of the axle pin are deformed to attach the roller bearing wheels to the link component.

In still another aspect, the invention relates to conveyor chain link including at least one roller bearing wheel, an axle pin, and a link component. The roller bearing wheel includes a female receiver opening having a cross-section wherein the female receiver opening cross-section comprises at least one flat surface. The axle pin includes first and second axial ends, at least one of the axial ends defining a male engagement profile, wherein the male engagement profile is configured to match the female receiver opening cross-section of the roller bearing wheel.

In still another aspect, the invention relates to a conveyor chain for a commercial baking conveyor comprising a plurality of conveyor chain links coupled to one another to form an elongate assembly allowing relative pivotal movement between adjacent links. At least one link comprises a link component, an axle pin, and a roller bearing wheel. The link component includes first and second ends, each configured to attach to an adjacent link in the conveyor chain, and a medial section therebetween. The medial section includes a bore. The axle pin includes first and second axle ends and a medial section therebetween. The medial portion comprises at least one surface engagement feature configured for anti-spin engagement with the bore of the link component. The at least one roller bearing wheel, where an inner circumference of the roller bearing wheel comprises at least one engagement feature configured for anti-spin engagement with one of the first or second axle ends of the axle pin.

In still another aspect the invention relates to a conveyor chain link comprising a link component and an axle pin. The link component comprises a female engagement component. The axle pin comprises an elongated generally cylindrical axle pin body having a medial portion and two distal ends. The medial portion comprises at least one male engagement portion configured for cooperative engagement with the female engagement portion of the link component.

In still another aspect, the invention relates to a conveyor chain link comprising an axle pin and a link component. The axle pin comprises a medial portion having at least one surface engagement feature formed thereon and configured for anti-spin engagement with a link component. The link component comprises a bore. The bore includes an engagement feature configured for cooperative engagement with the surface engagement feature of the axle pin.

These and other aspects, features and advantages of the invention will be understood with reference to the drawing figures and detailed description herein, and will be realized by means of the various elements and combinations particularly pointed out in the appended claims. It is to be understood that both the foregoing general description and the following brief description of the drawings and detailed description of example embodiments are explanatory of example embodiments of the invention, and are not restrictive of the invention, as claimed.

DETAILED DESCRIPTION OF EXAMPLE EMBODIMENTS

The present invention may be understood more readily by reference to the following detailed description of example embodiments taken in connection with the accompanying drawing figures, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention. Any and all patents and other publications identified in this specification are incorporated by reference as though fully set forth herein.

Also, as used in the specification including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

Figure 1:
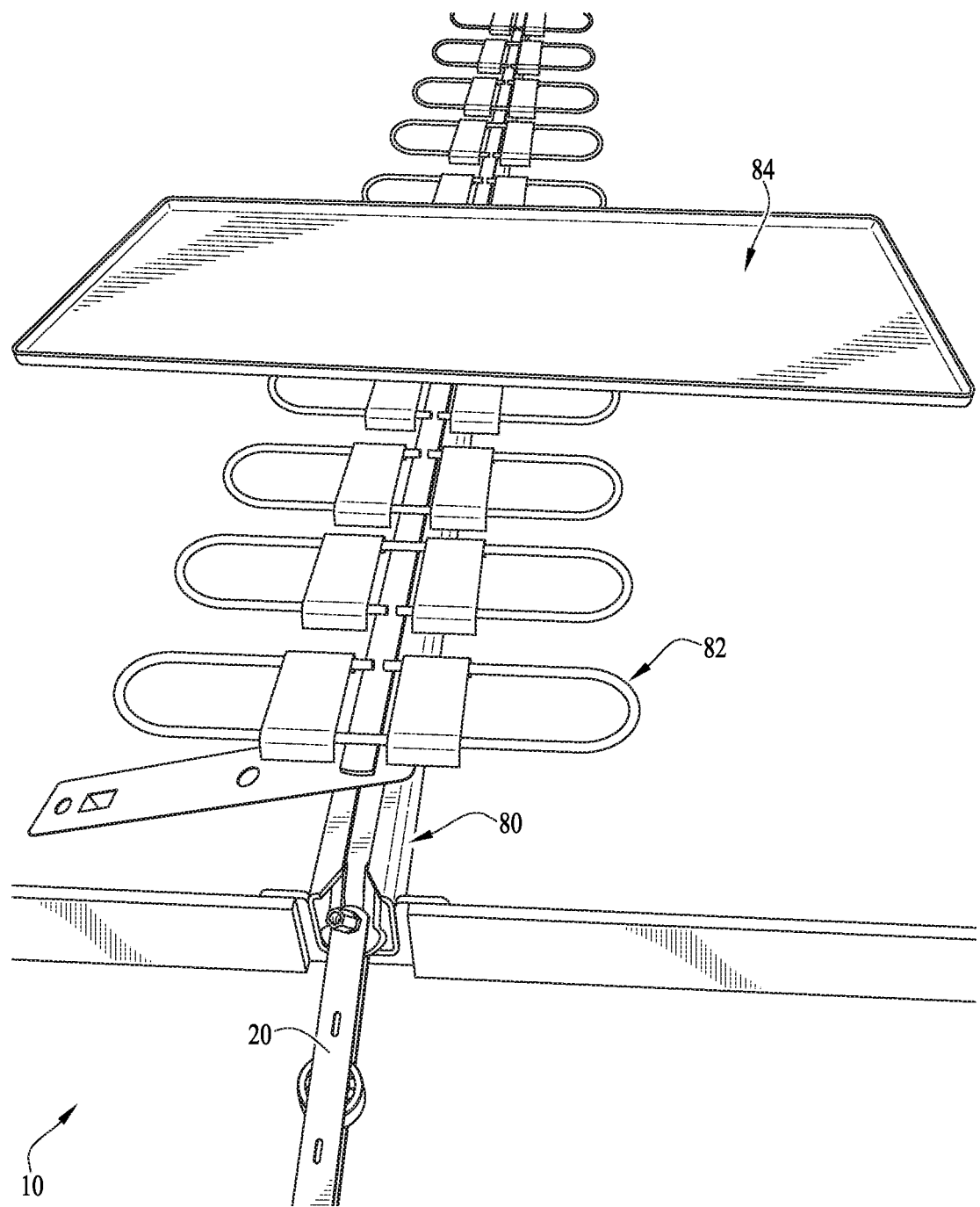
FIG. 1 is a perspective view of a conveyor system including a conveyor chain, to which example embodiments of the present invention can be applied.
Figure 2:
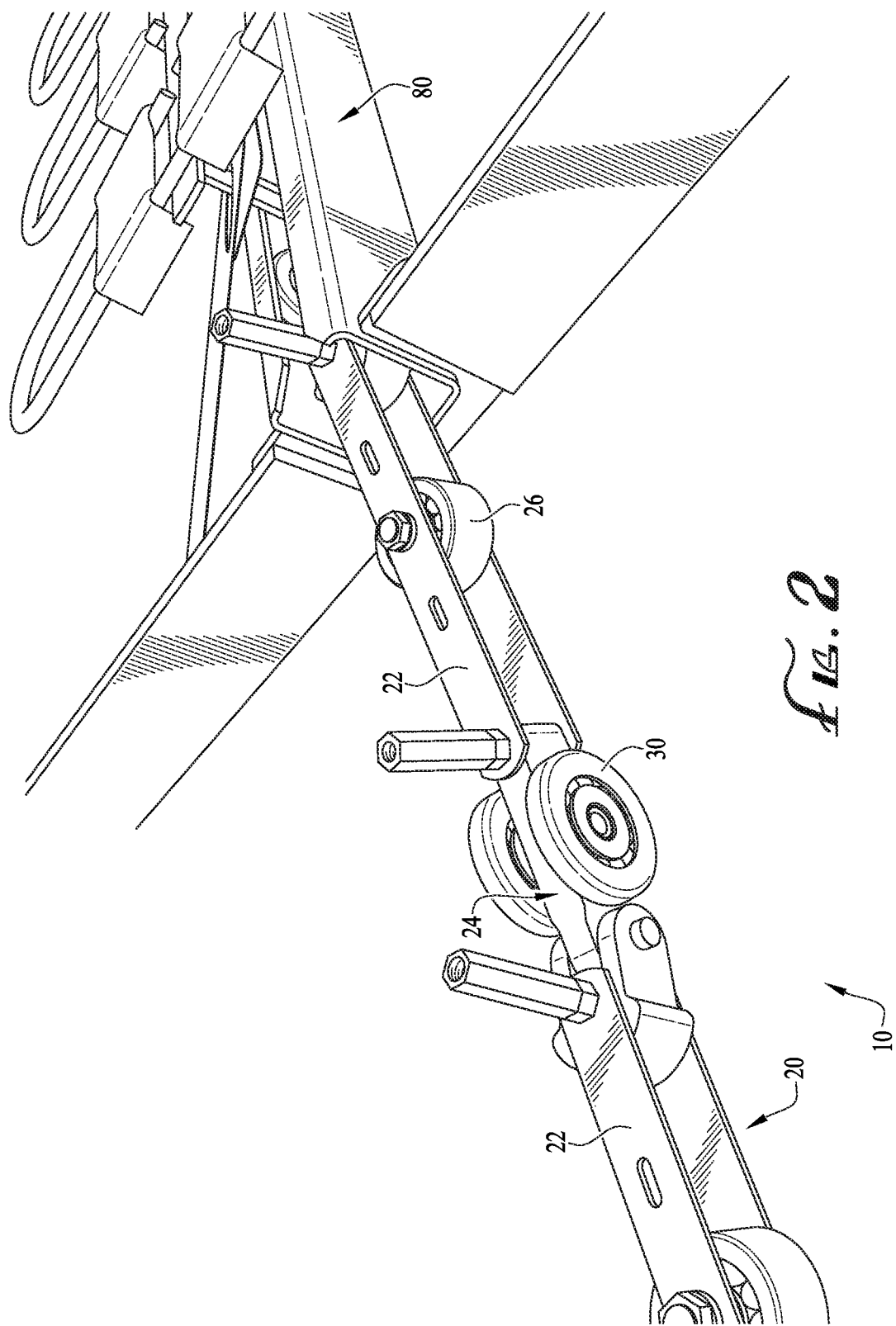
FIG. 2 is a perspective view of a conveyor chain link according to an example embodiment of the invention.

With reference now to the drawing figures, wherein like reference numbers represent corresponding parts throughout the several views, FIGS. 1 and 2 show a conveyor system 10 for commercial production of baked goods. The conveyor system 10 includes a roller chain 20 that travels through and along a guide track 80. The roller chain 20 may have one or more carrier(s) 82 mounted thereto, for carrying baking trays 84 and/or other conveyed equipment along a conveyor path defined by the guide track 80. For example the guide track 80 can carry baking trays 84 through a proofer, oven, or other commercial baking equipment.

The roller chain 20 comprises a plurality of interconnected links 22 pivotally or flexibly coupled to one another, allowing the chain to conform to and follow the conveyor path of the guide track 80. One or more of the links 22 preferably comprise roller-carrier links 24, to which vertical roller bearing wheels 30 are mounted. One or more links 22 can also optionally carry horizontal guide wheels or rollers 26 oriented generally transverse or perpendicular to the vertical roller bearing wheels 30.

The roller-carrier links 24, shown in FIGS. 3-6, generally comprise at least one roller bearing wheel 30, an axle pin 50, and a link component 60. In the depicted embodiment, the roller carrier link 24 includes two roller bearing wheels 30. The roller bearing wheels 30 are mounted to the link component 60 by the axle pin 50 extending through a bore or channel 62 in the link component.

Figure 3:
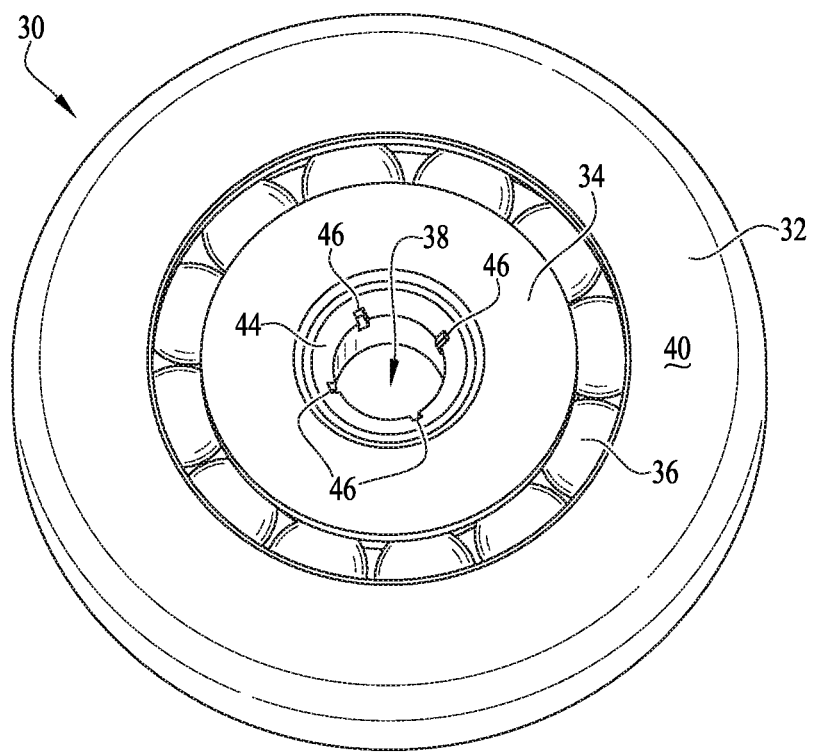
FIG. 3 is a perspective view of the bearing of the conveyor chain link of FIG. 2.

A roller bearing wheel 30 according to an example embodiment of the invention is shown in FIG. 3. The roller bearing wheel 30 is generally circular including an outer race 32 having a circular outer circumferential rim and a concentrically located inner race 34. In the example embodiment, a plurality of ball bearings 36 are retained in an annular space between the inner race 34 and the outer race 32. The roller bearing wheel 30 is generally formed from a metal material, for example standard grade steel. The outer race 32 is configured to rotate as it moves along the guide track 80. The inner race 34 is configured to remain generally stationary. The inner race 34 includes a front surface 40 and a rear surface 42 with a hole 38 extending through the inner race from the front surface to the back surface. In example embodiments, the inner diameter or inner circumference of the front face 40 of the inner race 34 includes a chamfer or beveled section 44 extending inward toward the hole 38. The inner race 34 can include an engagement feature 46 configured for anti-spin engagement with the axle pin 50. In the depicted embodiment, four groves 46 are provided at approximately 90° intervals about the beveled section 44 of the inner race 34. In example embodiments, the grooves 46 are formed by laser etching or otherwise machined into or onto the beveled surface 44 of the inner race 34. The grooves 46 can have, for example, a depth of around 0.015 inches and a width of about 0.100 inches. In other embodiments, the inner race 34 does not include a beveled section 44, and the grooves are positioned on the front surface 40. In other embodiment, more or fewer grooves 46 can be used. The grooves 46 are configured to interact with the axle pin as detailed below. In other embodiments, other engagement features are used for anti-spin engagement with the axle pin 50.

Figure 4:
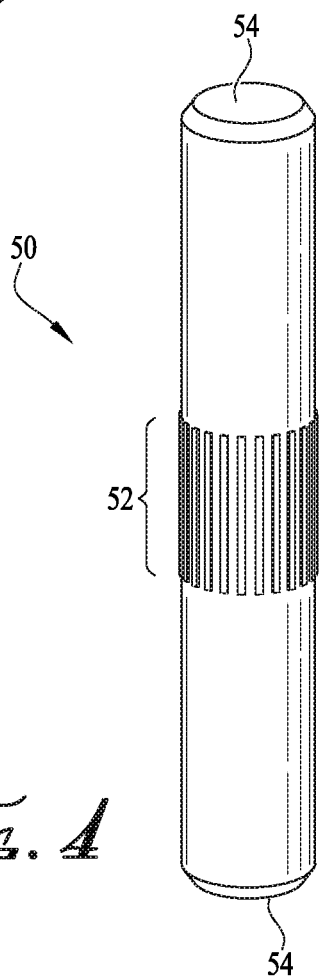
FIG. 4 is a perspective view of the axle pin of the conveyor chain link of FIG. 2.

An axle pin 50 according to an example embodiment of the invention is shown in FIG. 4. The axle pin 50 generally has an elongated, cylindrical axle pin body having a medial portion 52 and two distal ends 54. In the depicted embodiment, the axle pin 50 includes a knurled or ribbed central or medial portion 52 having alternating ridges and grooves extending generally parallel with the lengthwise axis of the pin. The ribbed medial portion 52 is configured to create friction between the axle pin 50 and the link component 60 to prevent spinning of the axle pin. In other embodiments, another pattern can be used on the medial portion 52 to create friction. The distal or outer ends 54 of the axle pin 50 are configured to be received within the inner diameter of the inner bearing race 34 of the roller bearing wheel 30 with an interference or press fit. The outer ends 54 of the axle pin 50 are preferably flared or riveted down to expand the outer diameter of the ends and cause the material of the axle pin to flow or expand into the groove or grooves 46 in the inner bearing race 34 to attach the roller bearing wheel 30 to the link component 60. This is intended to lock the axle pin 50 in place within the inner bearing race 34 of the roller bearing wheels 30 and resist or prevent spinning of the axle pin within the inner bearing race 34.

In example embodiments, the outer diameter of the axle pin 50 is about 0.32 inches and the length is about 1.75 inches. The outer diameter and length of the axle pin 50 can optionally be larger or smaller in alternative embodiments. The fit between the ends 54 of the axle pin and the hole 38 in the inner race 34 is preferably configured to maintain engagement and resist spinning or relative movement between the engaged surfaces, through an intended range of operating temperatures and thermal expansion and contraction of the equipment. The axle pin 50 is generally formed from a metal material, such as standard grade steel. The axle pin can also be plated, for example in zinc. In example embodiments, the medial portion 52 of the axle pin 50 is induction hardened to be a greater hardness than the link component 60. For example, the medial portion 52 of the axle pin 50 is hardened at a depth of around $\frac{1}{16}^{th}$ of an inch. For example, the medial portion 52 is hardened to have a hardness of around 120 on the Rockwell B Hardness scale. This allows the medial portion 52 to provide "bite" into, or displace the material of, the bore 62 of the link component 60 for a more secure engagement. Optionally, the ends 54 of the axle pin 50 are unhardened allowing the material at the ends of the pin to more freely expand into the engagement feature 46 of the inner race 34 of the roller bearing wheel 30. In example embodiments, the ends 54 of the axle pin 50 have a hardness of about 60 on the Rockwell B hardness scale.

Figure 5:
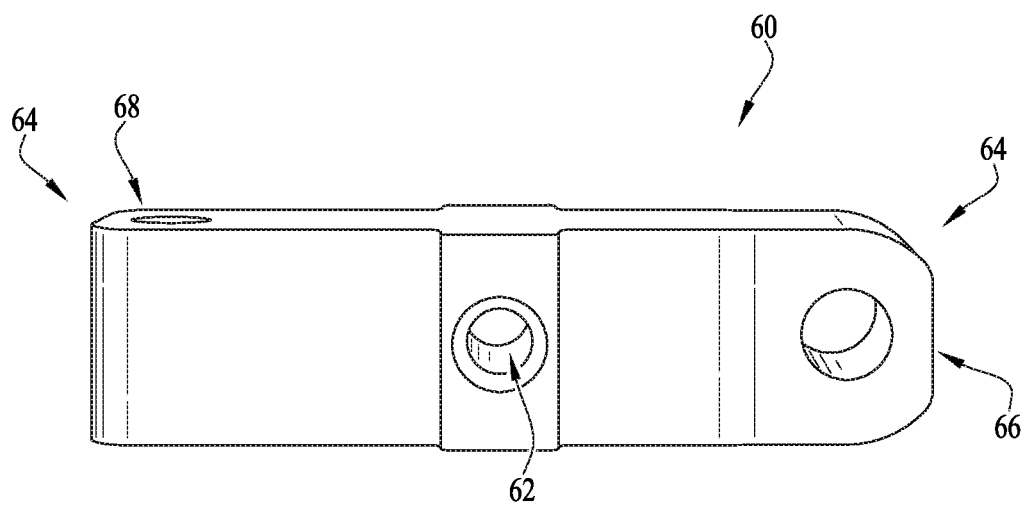
FIG. 5 is a perspective view of the link component of the conveyor chain link of FIG. 2.

A link component 60 according to an example embodiment of the invention is shown in FIG. 5. The link component 60 generally includes a bore or channel 62 in the medial portion of the link. The ends 64 of the link component 60 are configured to attach to the next link 22 in the roller chain. In the example embodiment, the link component 60 includes a first attachment 66 generally parallel to the bore 62 and a second attachment 68 generally perpendicular to the bore. The fit between the bore 62 and the medial portion 52 of the axle pin 50 is preferably configured to maintain engagement and resist spinning or relative movement between the engaged surfaces through an intended range of operating temperatures and thermal expansion and contraction of the equipment. The link component 60 is generally formed from a metal material, such as standard grade steel. The link component can also be plated, for example in zinc. In example embodiments, the metal has a hardness on the Rockwell B hardness scale of about 80 to about 100.

Figure 6:
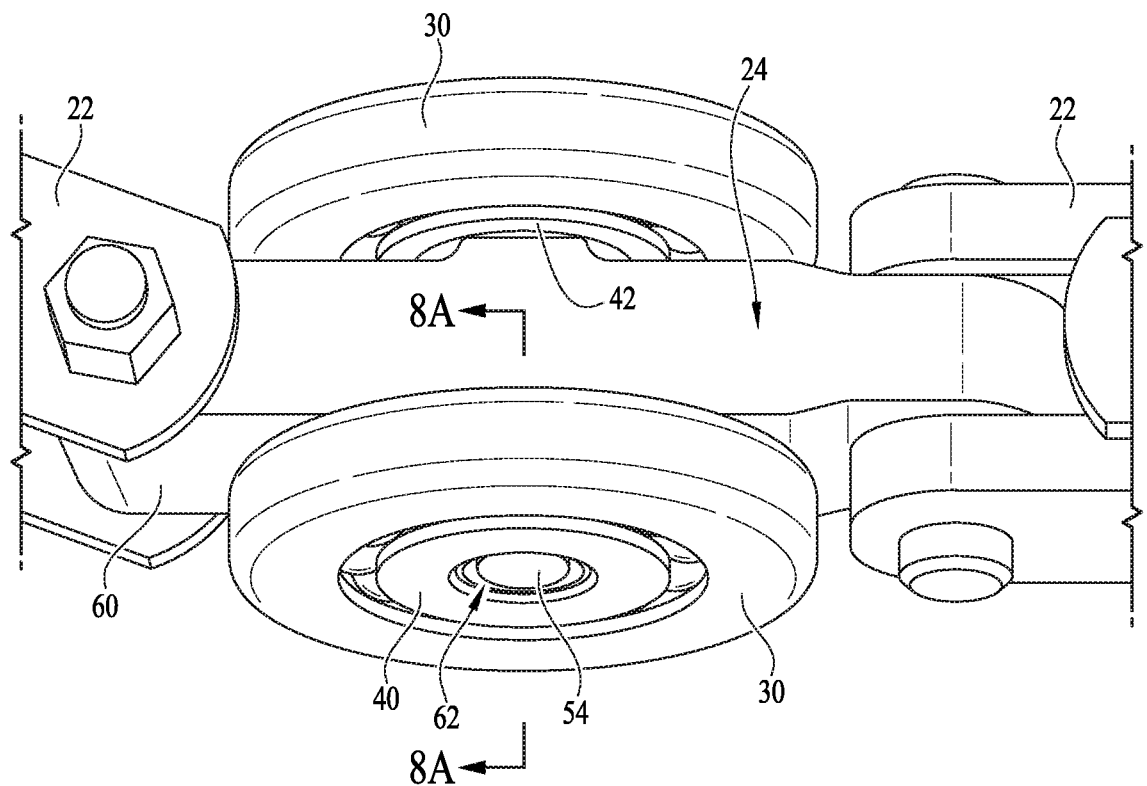
FIG. 6 is a perspective view of the conveyor chain link of FIG. 2.
Figure 7A:
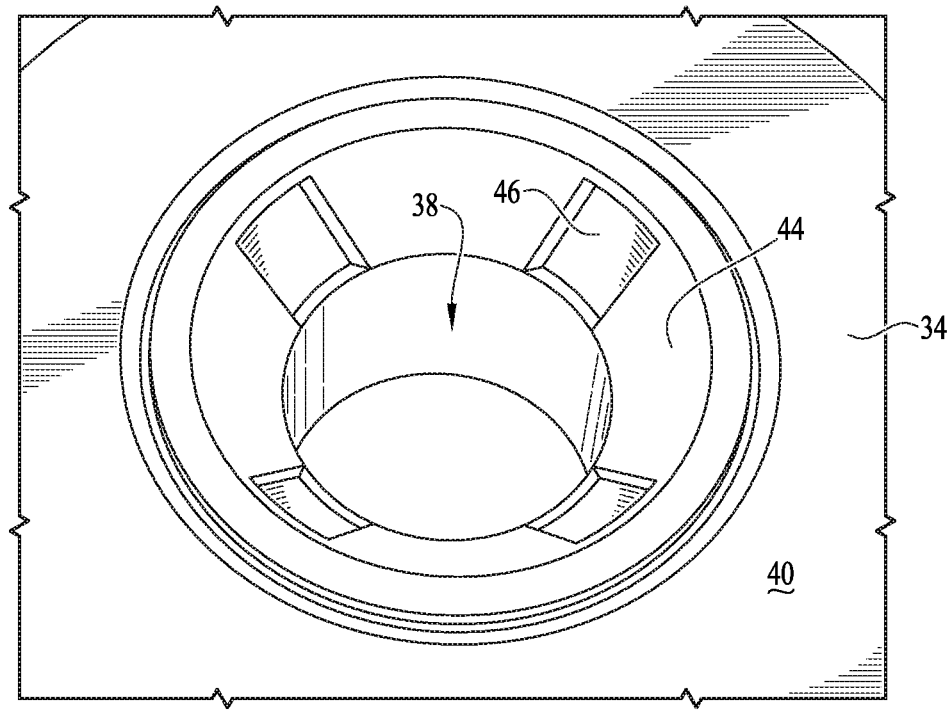
FIG. 7A is a detailed view of an inner race of the bearing of FIG. 3.
Figure 7B:
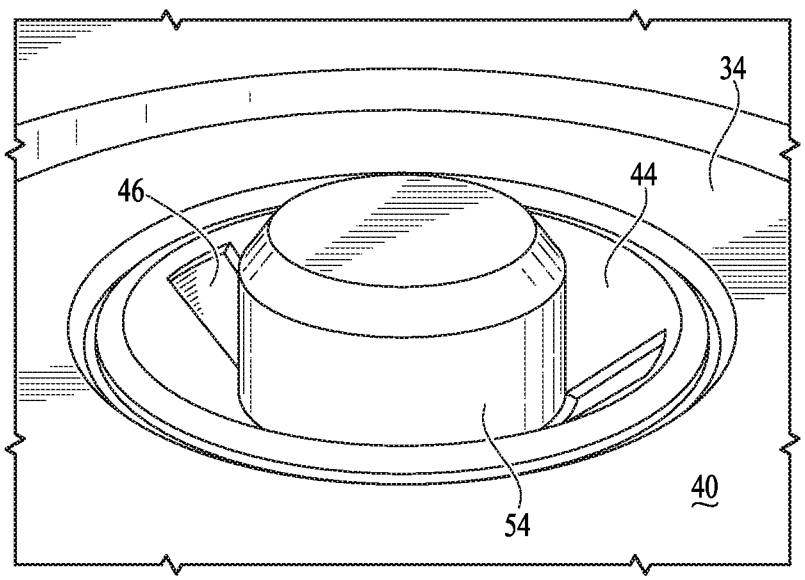
FIG. 7B is a detailed view of the inner race of FIG. 7A and an undeformed distal end of an axle pin.
Figure 8A:
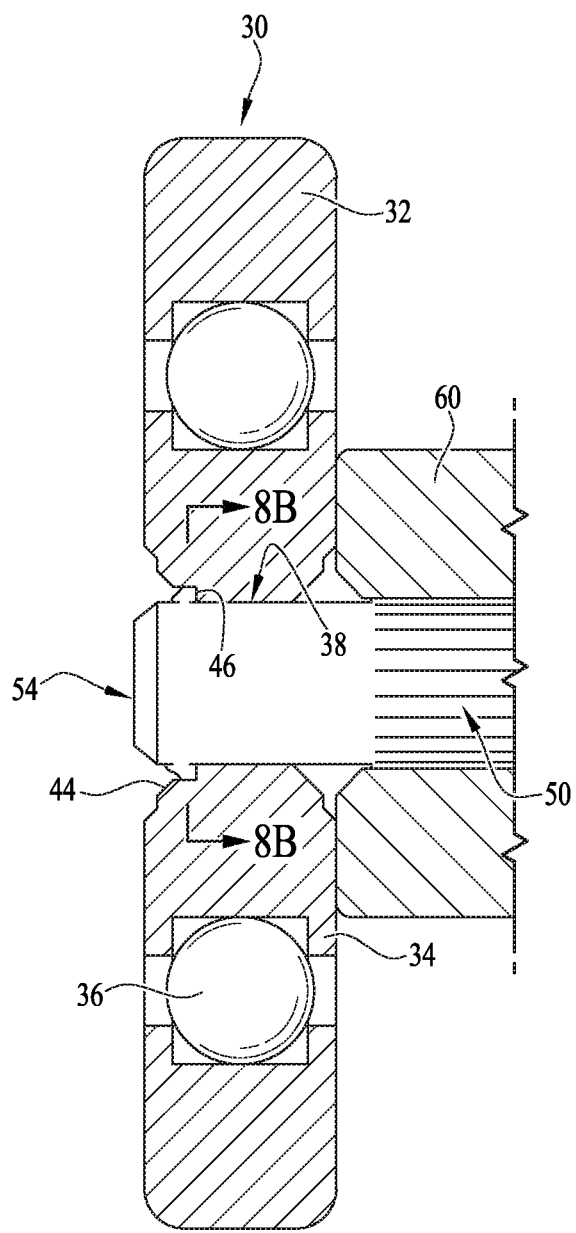
FIG. 8A is a cutaway view of the conveyor chain link of FIG. 2.
Figure 8B:
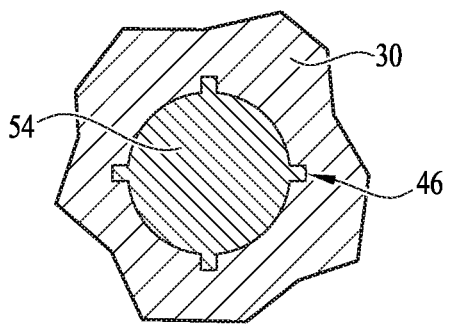
FIG. 8B is a cutaway view of the axle pin and bearing race of FIG. 8A.

To assemble the roller carrier link 24 as shown in FIG. 6, the roller bearing wheels 30 are positioned on either side of the link component 60. The rear surface 42 of the inner race 34 of the roller bearing wheels abuts the link component 60 and the front surface 40 of the inner race faces outward so that the engagement component 46 on the inner race is exposed, as shown in FIG. 8A. The hole 38 in the inner race 34 of each roller bearing wheel 30 is aligned with the bore 62 of the link component 60. The axle pin 50 is push or press fitted through the hole 38 in the inner race 34 of the first roller bearing wheel 30, through the bore 62 in the link component 60 and through the hole in the inner race of the second roller bearing wheel. The axle pin 50 is positioned such that the medial portion 52 is within the bore 62 of the link component 60 and each end 54 of the axle pin extends beyond the hole 38 in each roller bearing wheel 30, as shown in FIG. 7B. The ends 54 of the axle pin 50 are then flared or riveted down, for example by orbital forming from both sides, to expand the outer diameter of the ends of the axle pin and cause the material of the axle pin to flow or expand into the engagement feature 46 on the inner bearing race 34, as shown in FIGS. 8A and 8B. The flared ends of the axle pin 50 holds the roller bearing wheels 30 in engagement with the link component 60. In alternative embodiments, the roller carrier link 24 has one roller bearing wheel 30 positioned on one side of the roller pin link 60. In this embodiment, the link component 60 can include grooves 46, similar to those on the roller bearing wheel 30, configured to engage a deformed end of the axle pin 50.

Figure 9:
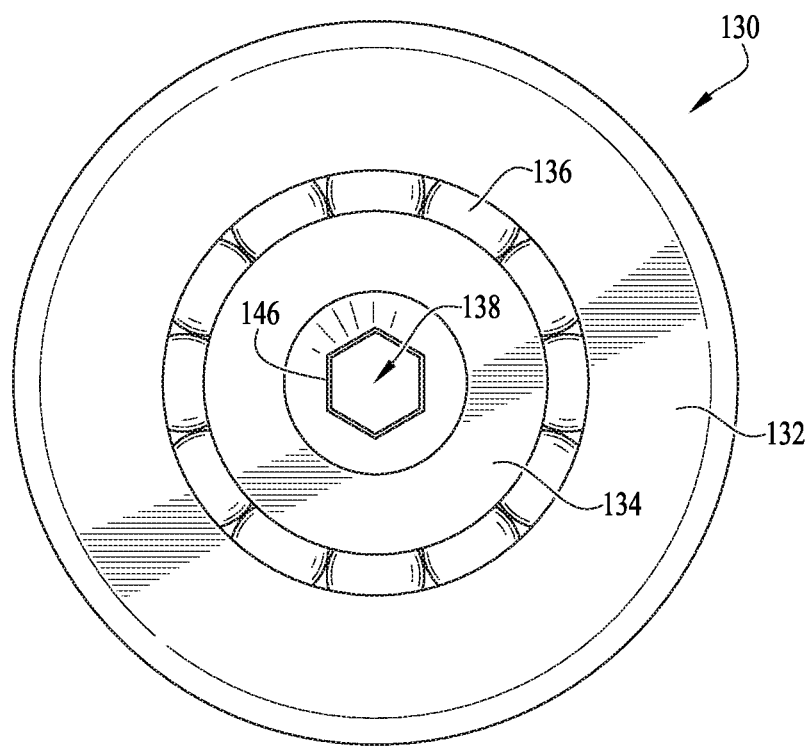
FIG. 9 is a side view of bearing for a conveyor chain link according to another example embodiment of the present invention.
Figure 10:
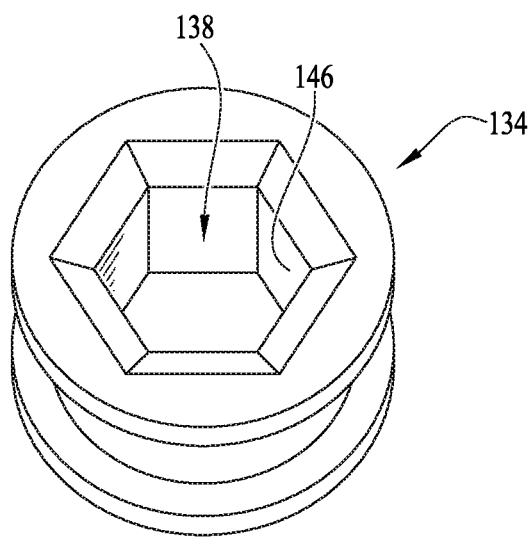
FIG. 10 is a perspective view of a portion of the inner race of FIG. 9.
Figure 11:
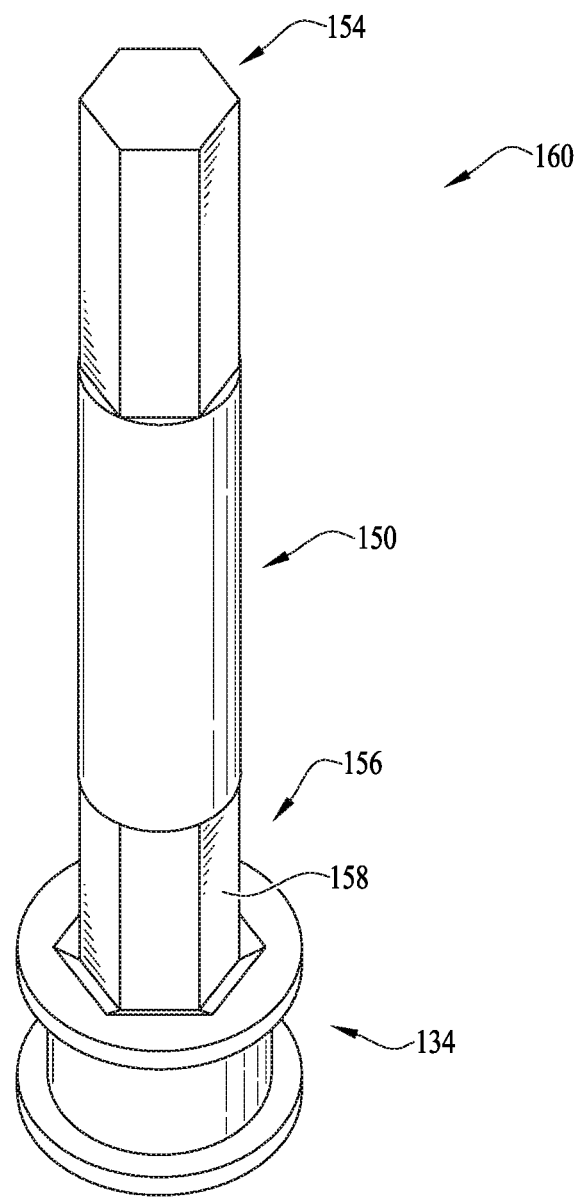
FIG. 11 is a perspective view of an axle pin and the bearing race of FIG. 10.

FIGS. 9-11 show an axle and bearing for a conveyor chain link, for example in a chain for a commercial baking system conveyor, according to another example embodiment of the invention. The roller bearing wheel 130, shown in FIG. 9, includes an outer race 132, an inner race 134, and a plurality of ball bearings 136 similar to the previous embodiment. However, in this embodiment, the inner bearing race 134 includes a central female receiver opening or hole 138 bounded by at least one flat surface 146. In example embodiments, the hole 138 includes a plurality of flat surfaces 146 defining a polygonal bearing race receiver opening. In the depicted embodiment, shown in detail in FIG. 10, the bearing race receiver opening 138 is hexagonal, bounded by six uniformly configured flat surfaces 146. In alternative embodiments, three, four, five, seven, eight, or more flat surfaces 146 may bound and define a triangular, rectangular, square, pentagonal, heptagonal, octagonal, or other regular or irregular polygonal female bearing race receiver opening 138. In still further embodiments, the bearing race receiver opening 138 may be semi-circular having one or more flat surfaces 146 or keyed peripheral surface features.

The conveyor chain link includes an axle pin 150, shown in FIG. 11, with a male engagement profile configured to fit the female bearing race receiver 138. The axle pin 150 generally comprises an elongate body having first and second ends 154, 156, and a transverse dimension extending generally perpendicular to the axial direction. At least one of the first and second ends 154, 156 defines a male engagement profile having at least one flat surface 158 formed thereon. In example embodiments, the axle pin 50 includes a plurality of flat surfaces 158 defining a polygonal male engagement profile for cooperative engagement with the female receiver opening 138 of the inner race 134 of the roller bearing wheel 130. In the depicted embodiment, the male engagement profile is hexagonal, comprising six uniformly configured flat surfaces 158. In alternative embodiments, the male engagement profile can comprise three, four, five, seven, eight, or more flat surfaces 158 to define a triangular, rectangular, square, pentagonal, heptagonal, octagonal, or other regular or irregular polygonal male engagement profile. In still further embodiments, the male engagement profile can be semi-circular having one or more flat or keyed peripheral surface features configured to generally match and be received within the corresponding female receiver opening 138 of the inner race 134 of the roller bearing wheel 130. The medial portion 152 of the axle pin 150 is optionally knurled or otherwise configured, as described in the previous embodiment, for engagement with a link component 60. The roller carrier link is assembled similar to the previous embodiment. The inner race 134 of the roller bearing wheel 130 can also include an engagement feature such as the grooves of to the previous embodiment.

Figure 12:
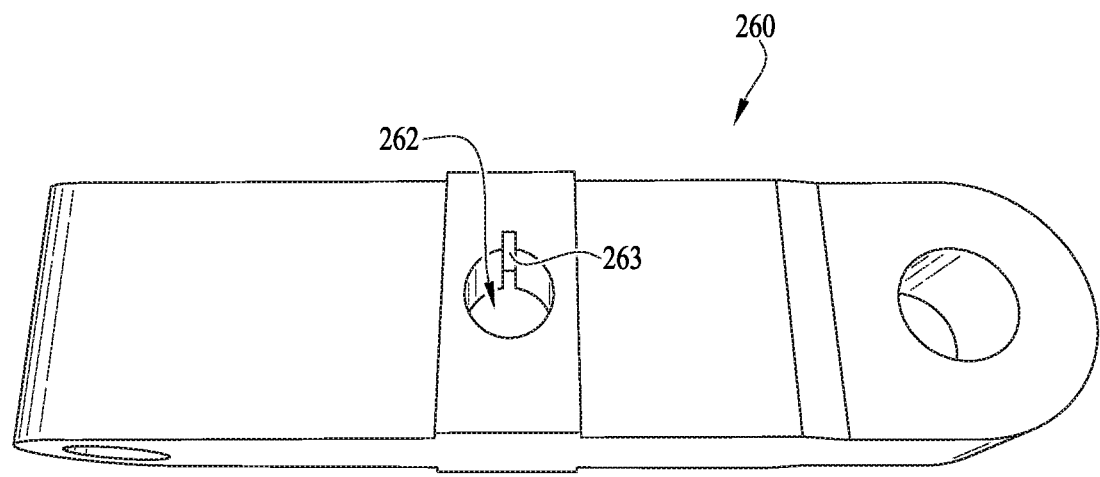
FIG. 12 is a perspective side view of a conveyor chain link according to another example embodiment of the present invention.
Figure 13:
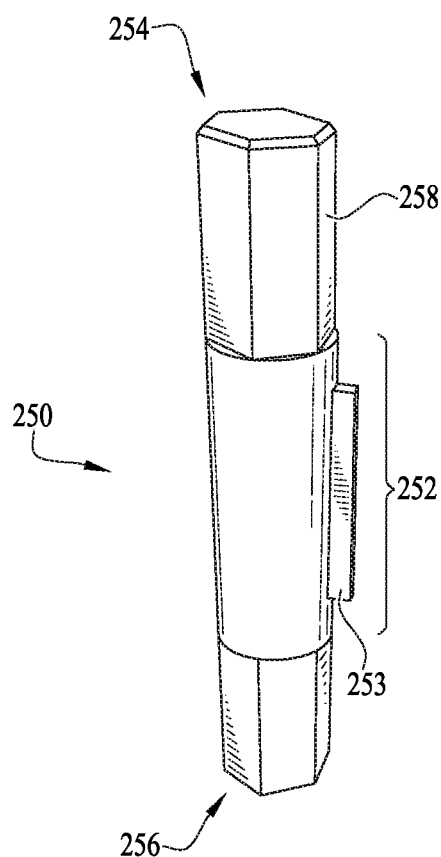
FIG. 13 is a perspective view of an axle pin for use with the conveyor chain link of FIG. 12.
Figure 14:
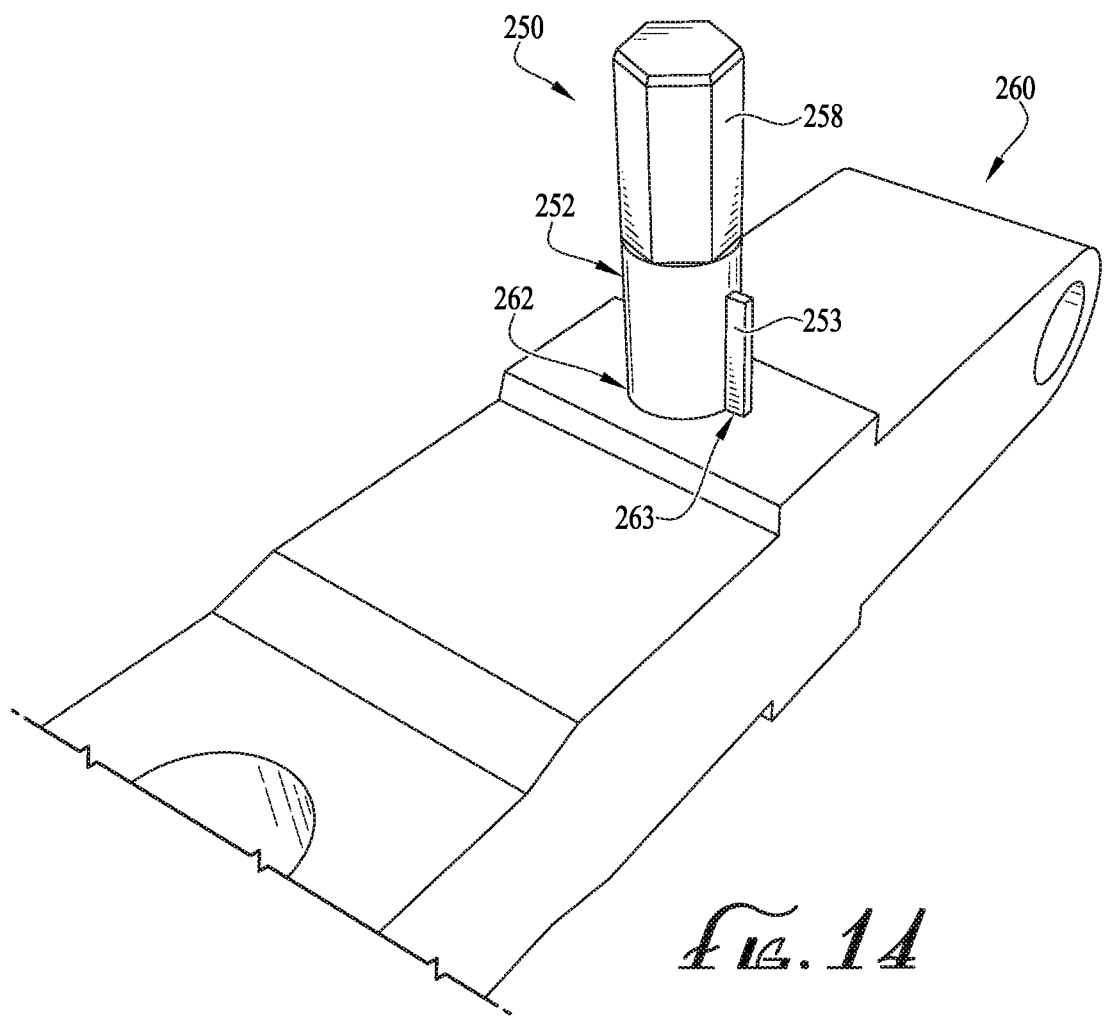
FIG. 14 is a perspective view of the axle pin of FIG. 13 inserted into the conveyor chain link of FIG. 12.

FIGS. 12-14 show an axle pin and link component for a conveyor chain link, for example in a chain for a commercial baking system conveyor, according to another example embodiment of the invention. The axle pin 250 and link component 260 are configured for use with a roller bearing wheel 130 similar to that of the previous embodiment. In the depicted embodiment, the axle pin 250 includes first and second ends 254, 256 having a male engagement profile configured to engage the female bearing race receiver 138 of the roller bearing wheel 130. In other embodiments, the first and second ends of the axle pin are flared or riveted into the roller bearing wheels as in previous embodiments.

In the axle pin 250, shown in FIG. 13, generally has an elongated, cylindrical axle pin body having a medial portion 252 between the first end 254 and the second end 256. In the depicted embodiment, the medial portion 252 of the axle pine 250 includes a male engagement feature 253. In the depicted embodiment, the male engagement feature is formed from a rib or flange 253. The rib 253 extends outward from the elongate body of the axle pin 250. In example embodiments, the rib 253 is positioned parallel to the length of the axle pin 250 and extends along a portion of a side of the medial portion 252. In other embodiments, the rib 253 extends along the entire length of the medial portion 252 of the axle pin 250.

The axle pin 250 is configured to engage the link 260 depicted in FIG. 12. As in previous embodiments, the link 260 includes a bore or channel 262 in the medial portion of the link. The link 260 generally includes a female engagement 263 feature configured to engage the male engagement feature 253 of the axle pin 250. In the depicted embodiment, the female engagement feature of the link 260 includes a slot or key way 263 cut into a perimeter surface of the bore or channel 260. The slot 263 is dimensioned to receive the rib 253 of the axle pin 250 as it is inserted through the bore 262 in the link 260, as shown in FIG. 14. The engagement between the female keyway 263 and the male rib 253 helps prevent the axle pin 250 turning in the bore 262 of the link 260. This anti-spin feature can help prevent wear on the medial portion 252 of the axle pin 250 thereby extending the life of the axle pin. In other embodiments, the axle pin 250 can include a female engagement feature, like a slot, and the link 260 can include a female engagement feature, like a rib.

In other embodiments, the male and female engagement features positioned on the medial portion of the axle pin and the link correspond with the male and female engagement features positioned on the ends of the axle pin and the bearing race receiver of the bearing wheel. For example, the entire axle pin can define a male engagement profile including at least one flat surface and both the inner race and the bore of the link can include a polygonal female receiver opening designed to correspond with the male engagement profile. In other embodiments, the axle pin can include a male engagement rib extending along the length of the axle pin. Both the bore of the link and the inner race of the roller bearing wheel can include a female engagement slot configured to engage the male rib. In other embodiments, other forms and combinations of male and female engagement features can be used.

While the invention has been described with reference to example embodiments, it will be understood by those skilled in the art that a variety of modifications, additions and deletions are within the scope of the invention, as defined by the following claims.

What is claimed is:

1. A conveyor chain link comprising:
a link component comprising a female engagement portion;
an axle pin comprising an elongated generally cylindrical axle pin body having a medial portion and two distal ends, wherein the medial portion comprises at least one male engagement portion configured for cooperative engagement with the female engagement portion of the link component, and wherein the medial portion of the axle pin body is hardened to have a hardness greater than the link component to a depth of about 1/16 of an inch.

2. The conveyor chain link of claim 1, wherein the male engagement portion comprises a rib extending outward of an outer surface of the cylindrical axle pin body.

3. The conveyor chain link of claim 2, wherein the axle pin body defines a length and wherein the rib is positioned parallel to the length of the axle pin body.

4. The conveyor chain link of claim 1, wherein at least one of the two distal ends comprise a polygonal male engagement profile comprising a plurality of flat surfaces.

5. The conveyor chain link of claim 4, comprising at least one roller bearing wheel comprising a polygonal bearing race receiver opening, wherein the polygonal male engagement profile of the at least one distal end of the axle pin is configured to engage the polygonal bearing race receiver opening of the roller bearing wheel.

6. A conveyor chain comprising a plurality of conveyor chain links according to claim 1, successively coupled to one another to form an elongate assembly allowing relative pivotal movement between adjacent links.

7. A conveyor chain link comprising:
a link component comprising a female engagement portion;
an axle pin comprising an elongated generally cylindrical axle pin body having a medial portion and two distal ends, wherein the medial portion comprises at least one male engagement portion configured for cooperative engagement with the female engagement portion of the link component, and wherein at least one of the two distal ends comprise a polygonal male engagement profile comprising a plurality of flat surfaces, and wherein the medial portion of the axle pin body is hardened to have a hardness greater than the link component to a depth of about 1/16 of an inch.

8. The conveyor chain link of claim 7, wherein the male engagement portion comprises a rib extending outward of an outer surface of the cylindrical axle pin body.

9. The conveyor chain link of claim 8, wherein the axle pin body defines a length and wherein the rib is positioned parallel to the length of the axle pin body.

10. The conveyor chain link of claim 7, comprising at least one roller bearing wheel comprising a polygonal bearing race receiver opening, wherein the polygonal male engagement profile of the at least one distal end of the axle pin is configured to engage the polygonal bearing race receiver opening of the roller bearing wheel.

11. A conveyor chain comprising a plurality of conveyor chain links according to claim 7, successively coupled to one another to form an elongate assembly allowing relative pivotal movement between adjacent links.

12. The conveyor chain link of claim 4, wherein the polygonal male engagement profile is hexagonal.

13. The conveyor chain link of claim 7, wherein the polygonal male engagement profile is hexagonal.

\* \* \* \* \*